United States Patent [19]

Selinko

[11] Patent Number: 4,794,392

[45] Date of Patent: Dec. 27, 1988

[54] VIBRATOR ALERT DEVICE FOR A COMMUNICATION RECEIVER

[75] Inventor: George J. Selinko, Lighthouse Point, Fla.

[73] Assignee: Motorola, Inc., Schaumburg, Ill.

[21] Appl. No.: 17,283

[22] Filed: Feb. 20, 1987

[51] Int. Cl.[4] .......................... G08B 5/22; F16H 33/10

[52] U.S. Cl. ................................ 340/825.460; 310/81; 340/407; 74/87

[58] Field of Search ....................... 340/825.44, 825.46, 340/311.1, 407; 310/338, 339, 366, 81; 73/667, 672, 471, 475, 479, 579; 74/87

[56] References Cited

U.S. PATENT DOCUMENTS

| | | | |
|---|---|---|---|
| 3,017,631 | 1/1962 | Fink et al. | 340/825.46 |
| 3,618,070 | 11/1971 | Kagan | 340/825.46 |
| 3,623,064 | 11/1971 | Kagan | 340/825.46 |
| 3,911,416 | 10/1975 | Feder | 340/825.46 |
| 4,583,414 | 4/1986 | Wadensten | 310/81 |
| 4,587,863 | 5/1986 | Wadensten | 310/81 |
| 4,590,814 | 5/1986 | Wadensten | 310/81 |

*Primary Examiner*—Donald J. Yusko

*Attorney, Agent, or Firm*—Winfield J. Brown, Jr.; Joseph T. Downey; Anthony J. Sarli, Jr.

[57] ABSTRACT

An alerting device for a paging receiver for generating vibration motion in the paging receiver housing. The alerting means comprises an electric motor, an eccentric weight, and a linking means. The electric motor is activated in response to an alert signal for rotating a driving shaft. The driving shaft is coupled to the eccentric weight by the linking means for rotating the eccentric weight. The linking means includes a driving means and a receiving means such that rotary motion is transmitted from the shaft to the eccentric weight while preventing transmission of vibration motion from the eccentric weight to the shaft. The eccentric weight is mechanically attached to the housing for transmitting the vibration motion directly to the housing without passing the vibration motion through the electric motor.

21 Claims, 3 Drawing Sheets

10

VIBRATOR ALERT DEVICE FOR A COMMUNICATION RECEIVER

FIELD OF THE INVENTION

This invention relates to alerting devices for communication receivers and more particularly to a vibrating alert device for a paging receiver.

BACKGROUND OF THE INVENTION

Communication systems in general and paging systems in particular using selective call signalling have attained widespread use for calling a selected paging system receiver by transmitting information from a base station transmitter to the paging receiver. These small, compact paging receivers are extensively used in many different places and applications. In some places, such as movie theaters or the like, it is beneficial to provide a silent signal by generating an alert with mechanical vibrations instead of alert tones.

Numerous prior art paging receivers have developed vibration motion in the paging receiver by attaching an eccentric mass to a shaft being rotated by an electric motor. Examples of these prior art paging receivers are U.S. Pat. Nos. 3,623,064 and 3,911,416. These prior art vibrator alerting devices which require an eccentric mass to be mechanically attached to the shaft of the electric motor.

Numerous problems have been discovered by the Applicant in these prior art paging receivers. For example, since the eccentric mass is coupled to the shaft of the electric motor, the vibration motion of the mass is transmitted to the paging receiver housing through the electric motor casing. The vibratinn motion is transmitted to the housing through the bearings of the motor shaft. This has a tendency to quickly wear out the bearings of the shaft, causing excessive noise of the motor in operation and eventually causing the failure of the electric motor.

Another disadvantage is the shock load transmitted by the mass to the shaft when the paging receiver is mishandled or dropped. A strong enough shock can result in deforming the shaft and permanently damaging the motor.

Another problem of the prior art vibrator alerting devices is the vibration motion, generated by the eccentric mass, is absorbed by the motor, motor case, and bearings of the shaft, causing a decrease in the vibration sensation of the paging receiver.

These problems have caused manufacturers to purchase motors having very expensive bearings which increases the cost of the paging receiver to the consumer. Ultimately the resulting failure of the electric motor requires the consumer to replace the electric motor.

SUMMARY OF THE INVENTION

In accordance with the present invention, there is provided an apparatus and method for alleviating the aforementioned problems of the prior art alerting devices for paging receivers. Accordingly, the invention has as one of its objects a vibrating alert device for generating a tactile vibration motion in a paging recevver without transmitting the vibration motion to the the rotational motive mean.

It is another object of the present invention to decouple the vibration motion transmitted to the shaft from the eccentric weight while permitting the rotary movement of the shaft to drive the eccentric weight.

Another feature of the present invention is a linking means coupled between the rotational motive means and the vibrating weight which permits rotary motion transmitted between the motive means and vibrating weight while preventing stresses and strains to be transmitted back to the motive means.

In general, a vibrating alert device for a portable communication receiver includes a rotational motive means, an eccentric weight having a support means, and a linking means. The communication receiver is enclosed in a housing and has a decoding means for generating an alert signal in response to detecting received information. The rotational motive means, having a rotating shaft, is responsive to the alert signal for converting electrical energy to mechanical energy to drive the shaft. The eccentric weight, capable of being rotated about the support means, generates tactile vibrations being transmitted directly to the housing. The support means, coupled to the housing, holds the eccentric weight to the housing during rotation and transmits the vibration motion to the housing. The linking means couples the shaft to the eccentric weight for transmitting rotational movement from the shaft to the eccentric weight while preventing translation movement between the shaft and the counterweight.

In particular, the linking means includes a driving means, such as a driving pin attached to the shaft, and a receiving means, such as a slot, in the eccentric weight. The driving pin fits snugly into the slot for effecting rotary movement in the eccentric weight. The driving pin is allowed to slip in a radial direction with respect to tee axis of rotation of the shaft to prevent stress and strains from being transmitted from the eccentric weight to the shaft. This arrangement enhances the vibration sensation as the eccentric weight is directly coupled to the body of the radio and the impulse is not attenuated by going through the serial resistances of motor bearings, motor mass, and motor mountings.

BRIEF DESCRIPTION OF THE DRAWINGS

Referring to the drawings.

DESCRIPTION OF THE PREFERRED EMBODIMENT

In order to best illustrate the utility of the present invention, it is described in conjunction with a communication receiver, such as a paging receiver 10, capable of receiving and decoding encoded information. While the present invention is described hereinafter with particular reference to a paging receiver, it is to be understood at the outset of the description which follows, it is contemplated that the apparatus and methods, in accordance with the present invention, may be used with numerous other communication receiving devices.

The paging receiver described herein is associated with a paging system having a base station terminal, responds to coded information from the base station terminal, and in turn, generates an alert for a user during operation. With reference to the drawings in general, there is illustrated a paging receiver 10 and a vibrating alert device and method for generating a tactile vibration alert upon the paging receiver detecting and decoding information transmitted from the base station terminal.

Figure 1:
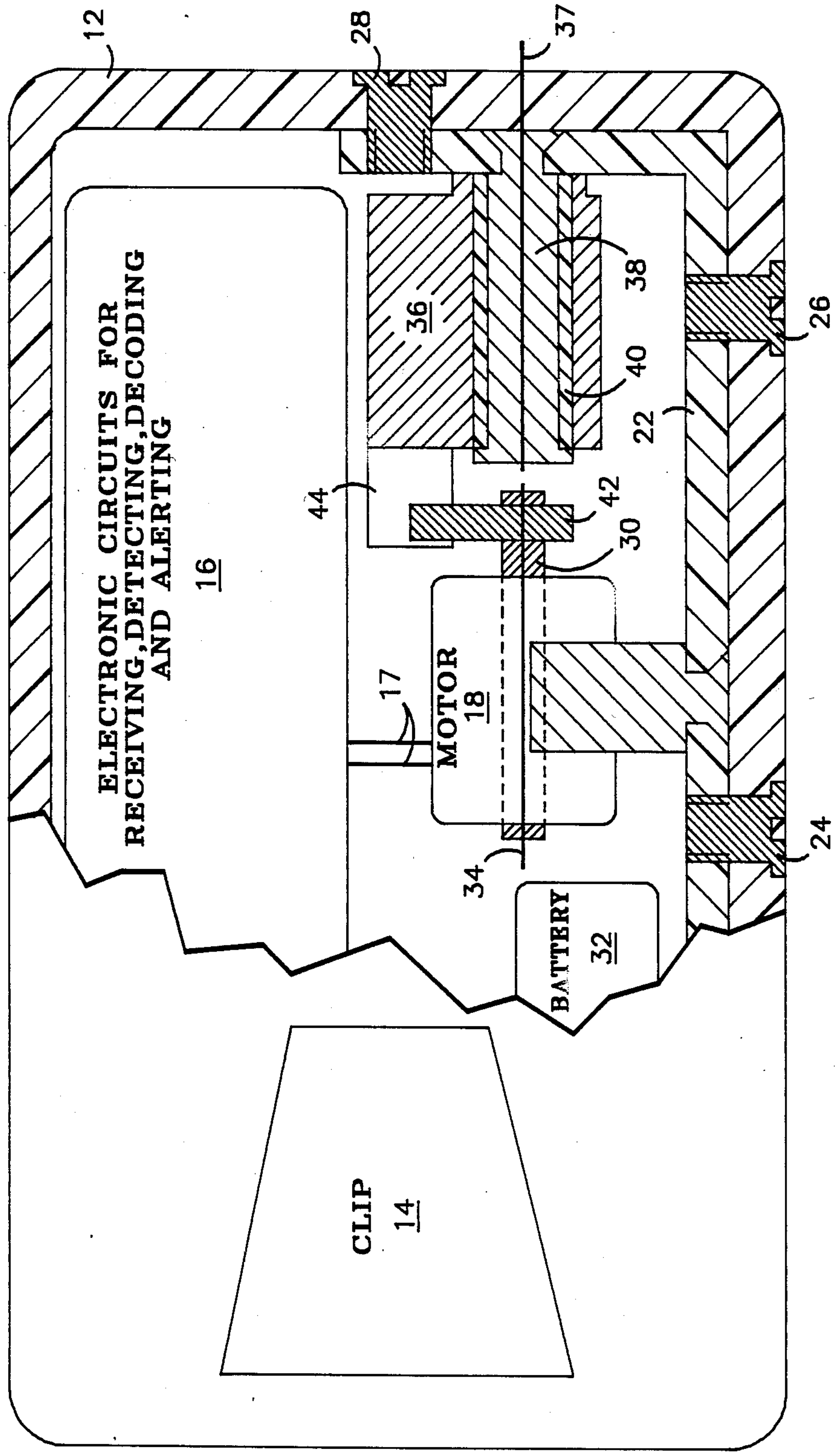
FIG. 1 is a pictorial view of a paging receiver with part of the external housing removed to show a vibrating alert device of the present invention.

More particularly, and with specific reference to FIG. 1, there is shown a portable paging receiver 10 which generates a tactile vibration alert when a correct radio frequency paging signal is received. The paging receiver 10 includes a housing 12 and a clip 14 attached to the housing 12. Clip 14 is typically used for attaching the receiver 10 to a shirt pocket or a belt and serves to transmit the vibrating motion of the paging receiver 10 to the body of the person beigg paged. A printed circuit board 16, which is rigidly attached to housing 12, includes electrical components which perform the functions of receiving a paging signal, identifying the pagin signal, activating the paging receiver 10 on an intended signal, and generating an electrical signal to activate a rotational motive means such as an electric motor 18. Since the electronic components on printed circuit board 16 are well known in the art and are not part of the invention herein disclosed, they will not be described in any detail.

Referring to FIG. 1, the electric motor 18, included in the vibrating alert device, is rigidly attached to a removable mounting structure 22 by a fastening means such as bracket 20. The mounting structure 22 is securely fastened to the housing 12 by an attaching means such as screws 24–28.

The electric motor 18 is also electrically connected to components on printed circuit board 16 and is rendered operative by receiving voltage from printed circuit board 16 when a properly identified paging signal is received by th electrical components on printed circuit board 16. The motor 18 may be rendered operative by applying constant DC voltage to the motor, by applying DC pulses to the motor, or by applying an AC signal to the motor. A battery 32 supplies the power to operate the electronic components on printed circuit board 16. Battery 32 also supplies the power to operate electric motor 18. A drive shaft 30 is attached to motor 18 and is rotated by motor 18 about an axis of rotation 34.

In the illustrated embodiment shown in FIG. 1, the axis of rotation 34 is coincident with the axis of drive shaft 30, however, the invention disclosed is not limited to having a drive shaft rotated about its own axis. Drive shaft 30, for example, could have its axis radially displaced from axis of rotation 34 and still be rotated about axis of rotation 34 by electric motor 18.

The vibrating alert device further includes an eccentric weight 36 attached to the mounting structure 22 by a support means such as axle 38. The eccentric weight 36 rotates about a axis of rotation 37. A bearing means, such as a bushing 40, surrounds the axle and allows the eccentric weight to rotate freely about axle 38. Axle 38 is mechanically attached to mounting structure 22 by staking or other well known methods. In FIG. 1, the axis of rotation 37 is coincident with the axis of rotation 34 of drive shaft 30, however, the invention disclosed is not limited to having the axis of rotation 34 of the drive shaft and the axis of rotation 37 of the eccentric weight coincident. Axis of rotation 37, for example, could be radially displaced from axis of rotation 34 and the weight 36 can still be rotated about axis of rotation 34 by electric motor 18.

A linking means including a driving means, such as drive pin 42, and receiving means, such as slot 44, transmit rotary motion from the drive shaft 30 to the eccentric weight 36. The drive pin 42 fits tangentially snugly within slot 44 but is allowed to move radially within slot 44 to prevent vibrating movements, stresses or strains from being transmitted from the weight 36 to the drive shaft 30.

In operation, an alert signal from the decoding means on the printed circuit board 16 activates the electric motor 18. The motor is normally at rest and, when activated, causes the drive shaft 30 to rotate about axis of rotation 34. The rotation of drive shaft 30 causes the drive pin 42 to also rotate about the axis of rotation 34. The drive pin 42 fits snugly within slot 44 for effectively transmitting the rotary movement of the drive pin 42 to the eccentric weight 36. Upon activating the electric motor 18, the drive shaft 30 rotates, causing the eccentric weight 36 to rotate about axis of rotation 37. Since the drive pin is allowed to move radially within slot 44, any translational movement caused by the rotating weight 36 is not transmitted back to the electric motor 18. The vibrating motion of the rotating weight is transmitted through bushing 40 to axle 38. Since axle 38 is mechanically attached to mounting structure 22, the vibration motion is transmitted directly to the mounting structure and subsequently to housing 12. The drive pin 42 and slot 44 effectively decouple an vibration motion from being transmitted from the eccentric weight 36 to the electric motor 18. Thus, the electric motor 18 does not transmit any vibrating motion to the housing 12, and in fact, transmits and receives a torque load from the eccentric weight.

Figure 2:
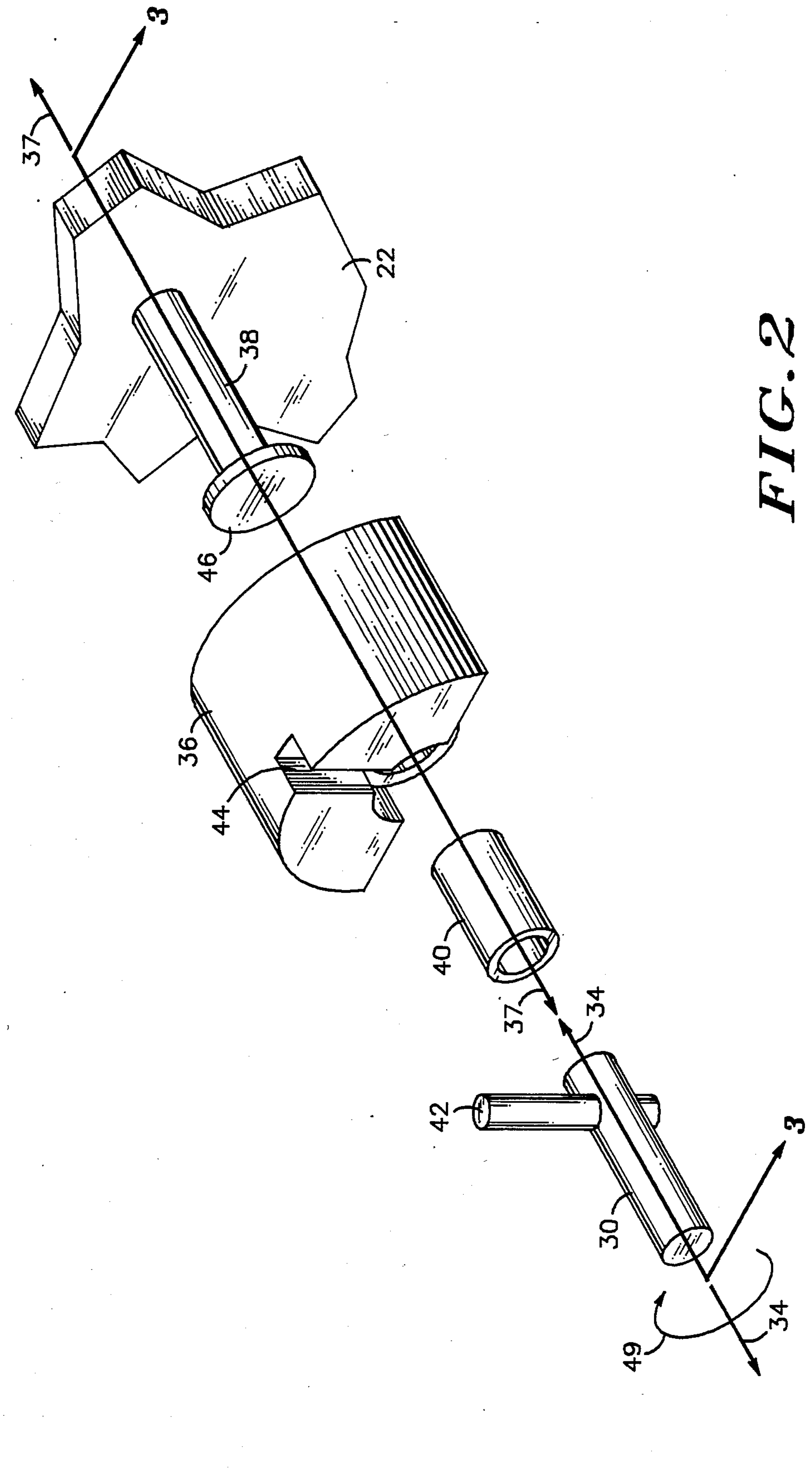
FIG. 2 is an exploded perspective view of the shaft, linking means, eccentric weight, and supporting means.

Referring to FIG. 2, there is shown an exploded perspective view of the vibrating alert device as shown in FIG. 1. The drive shaft 30 includes a driving pin 42 which extends radially from the axis of rotation 34. Driving pin 42 is mechanically attached to driving pin 30 by well known techniques. Driving pin 42 fits snugly in receiving slot 44 of eccentric weight 36. The driving pin 42 is allowed to slip in the radial direction in slot 44 but fits snugly in the tangential direction to provide positive contact between the driving pin and the slot walls for preventing play between the parts.

The axle 38 is rigidly attcched to mounting structure 22 by staking or other fastening means. The axle 38 includes a longitudinal portion extending along the axis of rotation of circular cross section and extending in a radially outwardly stop flange 46. The stop flange 46 prevents the eccentric weight from sliding off axle 38 and contacting the drive shaft 30 during operation. The bushing 40 provides a bearing surface between axle 38 and eccentric weight 36.

In operation, the drive shaft 30 is rotated, for example, in direction 49. In response, drive pin 42 is also forced to rotate in direction 49. Since drive pin 42 fits snugly within slot 44, the rotary movement of drive pin 42 is transmitted to the eccentric weight 36 via slot 44. The rotation of eccentiic weight 36 causes vibrating motion which is transmitted to the mounting structure 22 through axle 38. Any vibration motion generated by eccentric weight 36 is prevented from being transmitted to drive shaft 30 by allowing the drive pin 42 to slip radially inside slot 44. Thus, in operation, rotary motion is transmitted from the drive shaft 30 to the eccentric weight 36 while any lateral movement is prevented from being transmitted back to shaft 30.

In the illustrated embodiment shown in FIG. 2, the drive shaft 30 includes drive pin 42. However, the invention disclosed is not limited to having the drive shaft include the drive pin. For example, the drive shaft could include a drive slot similar to 44 and the eccentric weight 36 could include a receiving pin similar to 42. In this example, the rotary movement is transmitted from the drive slot to the receiving pin while the transmission of lateral movement from the eccentric weight to the drive shaft 30 is prevented by allowing the receiving pin to slip inside the drive slot.

Figure 3:
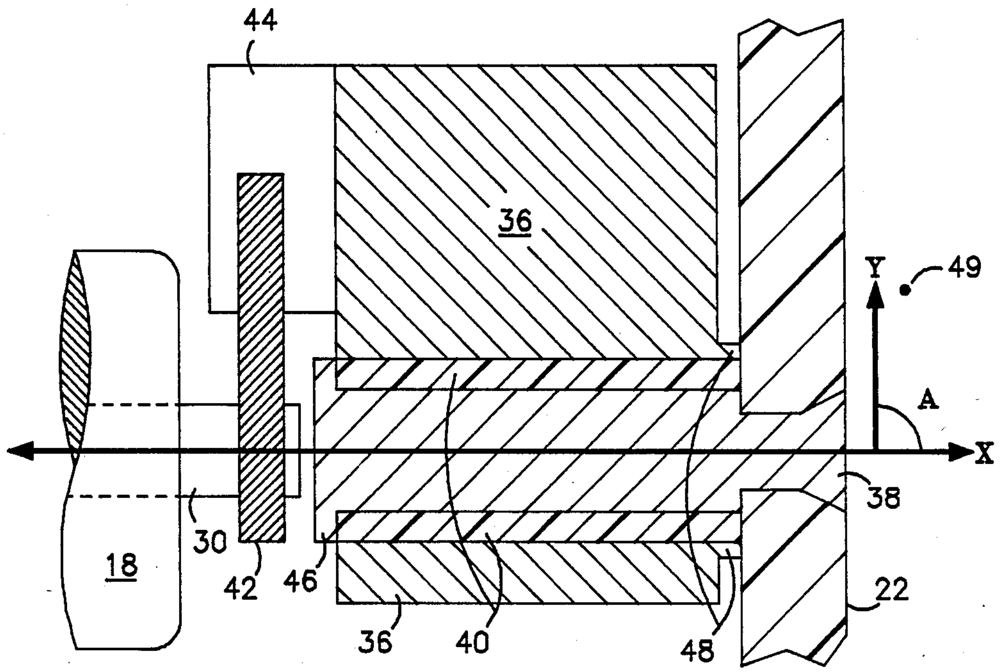
FIG. 3 is a view taken along line 3—3 of FIG. 2 showing a cross section of the shaft, linking means, eccentric weight, and supporting means.

Referring to FIG. 3, there is shown a cross section of the vibrating alert device taken along line 3—3 of FIG. 2. For purposes of illustration, the axis of rotation of the drive shaft is coincident with the axis of rotation of the eccentric weight 36 and is labelled as axis of rotation X. The radial direction is shown as axis Y. It is noted that the angle A between axis X and axis Y need not be 90 degrees but can take on any value less than 90 degrees. That is, drive pin 42 does not necessarily have to be mounted perpendicular to the axis of rotation X but needs to only extend out from the axis of rotation in a radial direction.

As is evident from FIG. 3, the drive pin 42 slips in the radial direction Y inside slot 44. Thus, no lateral movement is transmitted back from the eccentric weight 36 to electric motor 18. The bushing 40 provides a bearing surface between the eccentric weight 36 and axle 38. In the illustrated embodiment of FIG. 3, the axle 38 is staked to the mounting bracket in a manner well known in the art. As can be clearly seen, the radially extending stop flange 46 of the axle 38 prevents the eccentric weight from slipping longitudinally along the axis of rotation. The eccentric weight 36 also includes a radial cross section flange 48 which provides minimum contact between eccentric weight 36 and mounting structure 22. The flange 48 could also include a washer to provide a bearing surface between mounting structure 22 and eccentric weight 36.

As can be seen by FIG. 3, vibration motion is generated by the eccentric weight 36 and directed to the mounting structure 22 through axle 38. Any vibration motion generated by the eccentric weight 36 is prevented from being transmitted to the motor 18 by allowing drive pin 42 to slip radially inside slot 44.

Figure 4:
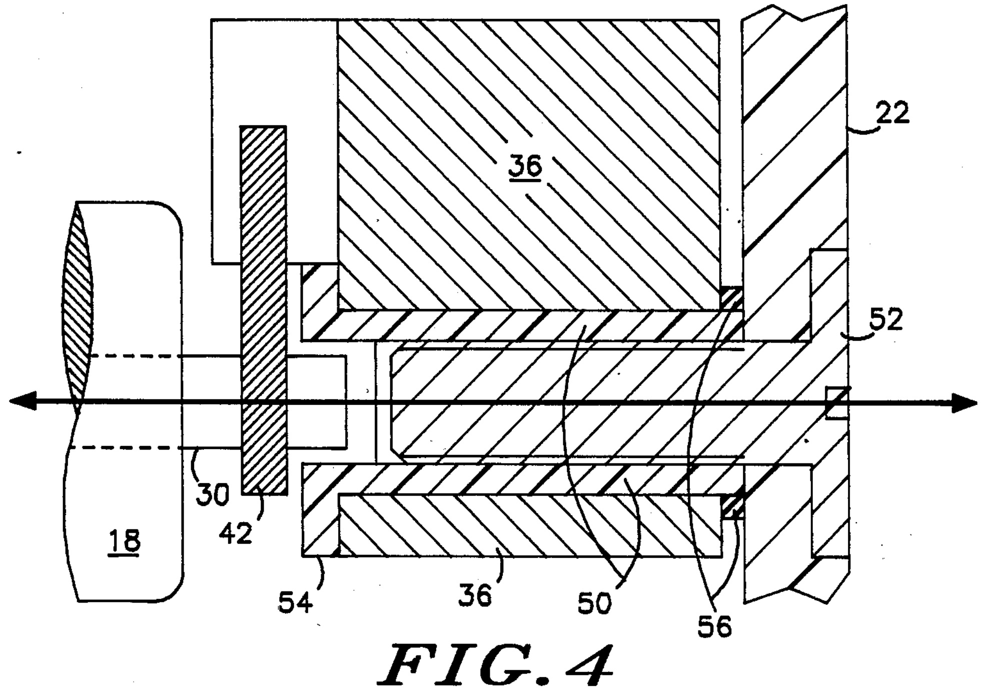
FIG. 4 is a view taken along line 3—3 of FIG. 2 for an alternative embodiment of the supporting means.

Referring to FIG. 4, there is shown an alternate embodiment for fastening the eccentric weight 36 to the mounting structure 22. In the illustrated embodiment of FIG. 4, the axle 38 is replaced by axle 52. Axle 52 is illustrated as a screw which securely holds a bushing 50 to the mounting structure 22. The weight 36 is allowed to freely rotate about the bushing 50. The bushing 50 also includes a radially extending stop flange portion 54 which prevents the eccentric weight from sliding off axle 52. Also, a bearing structure, such as a bronze washer 56, is provided between the mounting structure 22 and weight 36 to minimize friction.

In operation, vibration motion generated by the rotation of eccentric weight 36 is transmitted through bushing 50 to the axle 52. Since axle 52 is rigidly fastened to mounting structure 22, the vibration motion generated by eccentric weight is transmitted directly to the mounting structure 22.

Thus, there has been shown an alert device for vibrating a portable communication receiver, the communication receiver being enclosed in a housing. The communication receiver has a decoding means for generating an alert signal in response to detecting received information. The vibrating alert device includes a rotational motive means, an eccentric weight, a support means, and a linking means. In response to an alert signal from the decoding means, the rotational motive means rotates a drive shaft. The linking means couples the drive shaft to the eccentric weight for transmitting rotational movement from the shaft to the eccentric weight while preventing translational movement between the shaft and eccentric weight. The eccentric weight, when rotated, generates tactile vibrations which are transmitted by the support means directly to the housing.

The invention has been described with reference to specific embodiments, but this description is not meant to be construed in a limiting sense. Various modifications of the disclosed embodiment, as well as other embodiments of the invention, will become apparent to a person skilled in the art upon reference to the description of the invention. It is therefore contemplated that the appended claims will cover any such modifications or embodiments as fall within the true scope of the invention.

What is claimed is:

1. An alert device for vibrating a portable communication receiver being enclosed in a housing, the communication receiver having a decoding means for generating an alert signal in response to detecting received information, said alerting device comprising:

a rotational motive means for rotating a shaft about a first axis of rotation, the motive means being responsive to the alerting signal for converting electrical energy to mechanical energy to drive the shaft;

an eccentric weight capable of being rotated about a second axis of rotation to generate tactile vibration in the housing;

support means coupled to the housing for fixing said eccentric weight onto the housing during rotation of said eccentric weight and transmitting vibrating motion generated by the eccentric weight to the housing; and linking means coupling the shaft to said eccentric weight for transmitting rotational movement from the shaft to the eccentric weight while preventing translational movement from being transmitted between the eccentric weight and shaft, the linking means further providing for the transmission of rotational movement when the first axis of rotation is offset from the second axis of rotation.

2. The alert device of claim 1, wherein the motive means includes an electric motor and a fastening means for mechanically securing the motor to the housing.

3. The alert device of claim 1, further including a removal mounting structure being secured to the housing, said fastening means being mechanically connected to said mounting structure for securing the motor to the mounting structure and said support means being mechanically connected to said mounting structure for effecting the transmission of rotational movement from the motor shaft to said eccentric weight and for further effecting the transmission of vibration movement from the eccentric weight to the housing.

4. The alert device of claim 3, wherein said fastening means and said support means are secured to the mounting structure to position the rotational axis of the shaft to coincide with the rotational axis of said eccentric weight.

5. The alert device of claim 1, wherein said linking means includes a driving means and a receiving means, said driving means being mechanically fixed to the shaft and said receiving means being fixed to said eccentric weight, wherein said receiving means being in mechanical communication with said driving means converts rotary movement in the shaft to rotary movement in the eccentric weight.

6. The alert device of claim 5, wherein said driving means includes a driving pin mounted to the shaft, wherein said driving pin extends radially to the rotational axis of the shaft.

7. The alert device of claim 6, wherein the receiving means includes a slot in the eccentric weight, wherein the driving pin being permitted to move radially within the slot fits snugly inside said slot for effecting rotary movement.

8. The alert device of claim 1, wherein the support means includes a bearing member and an axle, wherein the bearing member surrounds the axle and the eccentric weight surrounds the bearing member for permitting the eccentric weight to rotate freely about the axle.

9. The alert device of claim 8, wherein the axle includes a longitudinal portion of annular cross section throughout the length thereof and terminating at a radially outwardly extending stop flange of increased radial thickness with respect to the radial thickness of the longitudinal portion to hold the eccentric weight positionally adjacent the housing.

10. The alert device of claim 9, wherein the eccentric weight includes a means for substantially holding eccentric weight to substantially hold the eccentric weight from the housing for minimizing friction between the eccentric weight and the housing.

11. A communication receiver enclosed in a housing including:

a mounting structure;

a decoding means responsive to received information for generating an alert signal in response thereof;

an electric motor coupled to said mounting structure and being responsive to the alert signal;

a shaft having a first axis of rotation connected to said motor and being rotated by said motor;

an axle coupled to the mounting structure;

an eccentric weight surrounding said axle and capable of bieng rotated about a second axis of rotation;

linking means for transmitting rotary movement from said shaft to said eccentric weight while preventing transmission of any vibrating movement from said eccentric weight to said shaft, the linking means further providing the transmission of rotational movement when the first axis of rotation is offset from the second axis of rotation;

wherein said eccentric weight, being rotated upon receipt of the alert signal by the motor, vibrates the communication receiver.

12. The communication receiver of claim 11, wherein the mounting structure is enclosed within the housing.

13. The communication receiver of claim 11, wherein the linking means includes a driving means and a receiving means, wherein the driving means fits snugly within the receiving means to transmit rotary movement while the driving means is allowed to slip in a radial direction with respect to the axis of rotation to prevent communication of vibrating movement between said driving means and receiving means.

14. The communication receiver of claim 13, wherein said driving means includes a driving pin.

15. The communication receiver of claim 14, wherein the receiving means includes a slot in said eccentric weight.

16. A method for vibrating a communication receiver, the communication receiver having a housing and a decoding means, the decoding means generating an alert signal in response to received transmitted information, said method including the steps of:

(a) mechanically coupling an electric motor having a first axis of rotation to the housing, the motor be responsive to the alert signal for rotating a shaft;

(b) mechanically coupling an eccentric weight having a second axis of rotation offset from said first axis of rotation to the housing, the weight being detached from the shaft and capable of being rotated;

(c) linking the eccentric weight to the shaft, the weight being responsive to rotary movement in the shaft; and (d) preventing transmission of vibration movement from the weight to the shaft.

17. The method of claim 16, wherein step (c) of linking further includes the steps of:

(e) mechanically securing a driving means to the shaft;

(f) positioning a receiving means in the weight corresponding to the driving means; and (g) coupling the driving means to the receiving means for transmitting rotary movement and for preventing transmission of vibration motion.

18. The method of claim 17, wherein step (f) of coupling further includes positioning the driving means inside the receiving means.

19. The method of of claim 16, further including the steps of:

(h) positioning the weight and the motor on a mounting structure to align the axis of rotation of the shaft to the axis of rotation of the weight; and (i) securing the weight and motor to the mounting structure; and (j) fastening the mounting structure to the housing.

20. An alerting device for vibrating a communication receiver, the communication receiver having a housing, a decoding means, and an electric motor, the decoding means generating an alert signal in response to received transmission information for effecting rotational movement in a shaft of the motor, the shaft having a first axis of rotation, said alerting device comprising:

an eccentric weight capable of being rotated about a second axis of rotation;

a removal mounting structure mechanically attached to the housing;

a means for attaching said rotatable eccentric weight to said mounting structure;

a means for fastening the motor to said mounting structure such that the shaft is positionally situated close to said weight for effecting rotary movement in said weight; and a means for transmitting rotary movement to said weight from the shaft while preventing vibration motion from being transmitted between the shaft and said weight, the means for transmitting further providing for the transmission of rotational movement when the first axis of rotation is misaligned from the second axis of rotation.

21. An alert device for vibrating a portable communication receiver being enclosed in a housing, the communication receiver having a decoding means for generating an alert signal in response to detecting received information, said alerting device comprising:

a rotational motive means having a rotating shaft, the motive means being responsive to the alerting signal for converting electrical energy to mechanical energy to drive the shaft;

an eccentric weight capable of being rotated to generate tactile vibration in the housing;

support means coupled to the housing for fixing said eccentric weight onto the housing during rotation of said eccentric weight and transmitting vibrating motion generated by the eccentric weight to the housing;

a driving means mechanically fixed to said eccentric weight, said driving means having a driving pin extending radially to the axis of rotation of the shaft; and a receiving means having a slot in the eccentric weight wherein the driving pin, being permitted to move radially within said slot, fits snugly inside said slot for converting rotary movement in the shaft to rotary movement in the eccentric weight while preventing translational movement from being transmitted between the eccentric weight and the shaft.

* * * * *